(12) United States Patent
Reischl

(10) Patent No.: US 9,586,763 B2
(45) Date of Patent: Mar. 7, 2017

(54) CONVEYOR ROLLER AND CONVEYOR SYSTEM WITH MOISTURE PROTECTION

(71) Applicant: TGW Mechanics GmbH, Wels (AT)

(72) Inventor: Josef Reischl, Gunskirchen (AT)

(73) Assignee: TGW Mechanics GmbH, Wels (AT)

( * ) Notice: Subject to any disclaimer, the term of this patent is extended or adjusted under 35 U.S.C. 154(b) by 0 days.

(21) Appl. No.: 15/028,073

(22) PCT Filed: Oct. 10, 2014

(86) PCT No.: PCT/AT2014/050242
§ 371 (c)(1),
(2) Date: Apr. 8, 2016

(87) PCT Pub. No.: WO2015/051392
PCT Pub. Date: Apr. 16, 2015

(65) Prior Publication Data
US 2016/0257500 A1    Sep. 8, 2016

(30) Foreign Application Priority Data
Oct. 11, 2013  (AT) .................................. 50657/2013

(51) Int. Cl.
*B65G 23/08* (2006.01)
*B65G 39/09* (2006.01)
(Continued)

(52) U.S. Cl.
CPC ............. *B65G 39/09* (2013.01); *B65G 13/06* (2013.01); *B65G 13/11* (2013.01); *B65G 23/08* (2013.01)

(58) Field of Classification Search
CPC ........ B65G 23/08; B65G 39/09; B65G 13/06; B65G 13/11
(Continued)

(56) References Cited

U.S. PATENT DOCUMENTS 1,725,740 A   8/1929   Schulte
4,241,825 A   12/1980  Brouwer
(Continued)

FOREIGN PATENT DOCUMENTS

DE              957 376 C      1/1957
DE       20 2004 020 677 U1   11/2005
(Continued)

OTHER PUBLICATIONS

Response to European Patent Office in PCT/AT2014/050240, dated Sep. 4, 2016, with English translation of relevant parts.
(Continued)

*Primary Examiner* — Douglas Hess
(74) *Attorney, Agent, or Firm* — Collard & Roe, P.C.

(57) ABSTRACT

Disclosed is a conveyor roller (1) which comprises a shaft (2), a roller body (3) which is mounted such that it can be rotated about the shaft (2), and a protective cap (4). The protective cap (4) has a disk-shaped first section (5) for covering the interior of the roller body (3), which is arranged fixedly with respect to the shaft (2) and is oriented normally with respect thereto, and a channel-like or roof-like second section (6) which is arranged obliquely with respect to the shaft (2) and runs over a part length of the roller body (3) such that it is spaced apart radially from the latter. Furthermore, a conveyor system (12) with a conveyor roller (1) is disclosed, in which conveyor system a connecting cable (7) of the conveyor roller (1) is run in a curve or a loop to an electrical interface (8, 17) with a connector box (15) of the conveyor system (12), wherein the lowest point of the curve/the loop is located below said interface (8, 17).

10 Claims, 4 Drawing Sheets

(51) Int. Cl.
    *B65G 13/06*     (2006.01)
    *B65G 13/11*     (2006.01)

(58) Field of Classification Search
    USPC .................... 198/781.07, 788, 860.1; 193/37
    See application file for complete search history.

(56) References Cited

U.S. PATENT DOCUMENTS

| | | | |
|---|---|---|---|
| 4,832,185 A | 5/1989 | Huber | |
| 5,022,513 A | 6/1991 | Huber | |
| 5,088,596 A * | 2/1992 | Agnoff | B65G 13/073 |
| | | | 198/788 |
| 5,442,248 A | 8/1995 | Agnoff | |
| 5,582,286 A * | 12/1996 | Kalm | B65G 47/261 |
| | | | 198/781.06 |
| 6,206,181 B1 * | 3/2001 | Syverson | B65G 13/06 |
| | | | 198/784 |
| 6,367,617 B1 | 4/2002 | Schiesser et al. | |
| 6,447,336 B1 * | 9/2002 | Fannin | H01R 13/5208 |
| | | | 439/587 |
| 6,672,449 B2 | 1/2004 | Nakamura et al. | |
| 6,710,505 B1 * | 3/2004 | Barani | B65G 13/06 |
| | | | 198/784 |
| 6,718,101 B2 | 4/2004 | Le Noane et al. | |
| 6,726,003 B2 | 4/2004 | Itoh et al. | |
| 6,879,078 B2 * | 4/2005 | Wolters | H02K 1/146 |
| | | | 310/216.074 |
| 7,035,714 B2 | 4/2006 | Anderson et al. | |
| 7,362,016 B2 * | 4/2008 | Cheng | A63B 22/02 |
| | | | 310/52 |
| 7,618,352 B1 * | 11/2009 | Wei | A63B 22/0257 |
| | | | 198/788 |
| 8,307,976 B2 * | 11/2012 | Kratz | B65G 23/08 |
| | | | 198/788 |
| 8,381,901 B2 * | 2/2013 | Yamamoto | B65G 13/02 |
| | | | 198/788 |
| 8,983,651 B2 * | 3/2015 | Combs | B65G 43/10 |
| | | | 700/230 |
| 9,150,357 B2 * | 10/2015 | Hager | B65G 13/11 |
| 2001/0037929 A1 | 11/2001 | Bond, Jr. et al. | |
| 2004/0035684 A1 | 2/2004 | Fukuoka | |
| 2004/0163934 A1 | 8/2004 | Kanaris | |
| 2004/0195078 A1 | 10/2004 | Anderson et al. | |
| 2007/0187132 A1 | 8/2007 | Watt | |
| 2009/0166157 A1 | 7/2009 | Kraetz et al. | |

FOREIGN PATENT DOCUMENTS

| | | |
|---|---|---|
| DE | 10 2004 043 197 A1 | 3/2006 |
| DE | 10 2010 002758 A1 | 9/2011 |
| EP | 0 300 128 A1 | 1/1989 |
| EP | 1 285 869 A2 | 2/2003 |
| EP | 1 285 869 A2 | 6/2003 |
| EP | 1 222 125 B1 | 10/2005 |
| EP | 2 455 310 A1 | 5/2012 |
| FR | 2 810 747 A1 | 12/2001 |
| GB | 2 435 124 A | 8/2007 |
| JP | S52-8882 U | 1/1977 |
| JP | S60-122615 A | 7/1985 |
| JP | H04-144812 A | 5/1992 |
| JP | H10-181829 A | 7/1998 |
| JP | 2000-247423 | 9/2000 |
| JP | 2003-051362 A | 2/2003 |
| JP | 2010-235292 A | 10/2010 |
| WO | 2004/067416 A1 | 8/2004 |
| WO | 2007/036421 A1 | 4/2007 |
| WO | 2011/029120 A1 | 3/2011 |
| WO | 2011/032196 A1 | 3/2011 |
| WO | 2012/094690 A1 | 7/2012 |
| WO | 2013-000006 A2 | 1/2013 |

OTHER PUBLICATIONS

Response to European Patent Office in PCT/AT2014/050241, dated Nov. 24, 2015, with English translation of relevant parts.
Response to European Patent Office in PCT/AT2014/050242, dated Aug. 6, 2015, with English translation of relevant parts.
Response to European Patent Office in PCT/AT2014/050265, dated Sep. 4, 2015, with English translation of relevant parts.
International Search Report in .PCT/AT2014/050265, dated May 11, 2015.
International Search Report of PCT/AT2014/050242, mailed Feb. 18, 2015.
International Search Report of PCT/AT2014/050240, mailed Feb. 13, 2015.
International Search Report of PCT/AT2014/050241, mailed Feb. 17, 2015.

* cited by examiner

# CONVEYOR ROLLER AND CONVEYOR SYSTEM WITH MOISTURE PROTECTION

CROSS REFERENCE TO RELATED APPLICATIONS

This application is the National Stage of PCT/AT2014/050242 filed on Oct. 10, 2014, which claims priority under 35 U.S.C. §119 of Austrian Application No. A 50657/2013 filed on Oct. 11, 2013, the disclosure of which is incorporated by reference. The international application under PCT article 21(2) was not published in English.

The invention relates to a conveyor roller comprising a shaft and a roller body mounted so as to be rotatable about the shaft, a motor disposed in the roller body for driving the roller body and a protective cap, which protective cap comprises a disk-shaped first section for covering the interior of the roller body which is arranged fixedly with respect to the shaft and is oriented normally with respect thereto, and a roof-like second section. The invention further relates to a conveyor system, which comprises a conveyor roller with a shaft, a roller body mounted so as to be rotatable about the shaft, a motor disposed in the roller body for driving the roller body, a protective cap and a connecting cable running out of the roller body and electrically connected to the motor. The conveyor system further comprises two frame profiles extending at a distance apart from one another between which the conveyor roller is disposed, a power supply and/or data line running along a frame profile and a connector box disposed on the frame profile which is electrically connected to the power supply and/or data line and to the connecting cable and which is disposed underneath the roof-like second section of the protective cap, and the connecting cable is provided with a plug or a socket at one end, and the connecting cable is run in a curve or a loop to a socket or a plug on the connector box, and the plug/socket connection forms an electrical interface, and the lowest point of the curve/loop is located underneath said interface.

A conveyor roller and a conveyor system of this type are known in principle and are widely used for conveying a varied range of objects, especially in warehouses and goods distribution centers. One problem that occurs with the use of conveyor rollers and a conveyor system is that they are exposed to dirt as well as to dripping liquids. For example, in the ease of fragile containers, there is no reliable way of guaranteeing that they still not leak and the liquid contained them will not spill out dun's transport. These liquids can cause serious damage to a conveyor roller or a conveyor system—especially if they are corrosive and/or electrically conductive—if they come into contact with mechanical and/or electrical components of the system. This can result in short-term damage such as short-circuits and faults in the control system, for example as well as long-term damage in the form of rust, corroded contacts and such like, for example.

WO 2012/094690 A1 and WO 2013/00006 A2 disclose a conveyor roller, which comprises a fixed shaft and a roller body mounted so as to be rotatable about the shaft, a motor for driving the roller body disposed in the roller body and a housing for a circuit board. The housing forms a protective cap having a disk-shaped section for covering the interior of the roller body and a projection extending radially with respect to the protective cap. The protective cap is disposed fixedly with respect to the shaft and is oriented normally with respect to it. A connecting cable connected to a plug is provided on the circuit board, which can be plugged into a socket on a connector box and supplies the motor and motor electronics with power.

WO 2011/032196 A1 and JPS 60-122615 A disclose a conveyor system with frame profiles and conveyor rollers disposed between the latter, and at least some of the conveyor rollers comprise a shaft, a roller body mounted so as to be rotatable about the shaft, a motor for driving the roller body disposed in the roller body and a connecting cable running out of the roller body which is electrically connected to the motor. The motor of the conveyor rollers is connected via the connecting cable to a common power supply.

An objective of the invention is to propose an improved conveyor roller and an improved conveyor system. In particular, the intention is to propose a simple but effective design for preventing damage to a conveyor roller and a conveyor system due to moisture. In particular, the connecting cable should also be protected from rubbing on the rotating conveyor rollers.

This objective is achieved by the invention by means of a conveyor roller of the type outlined above comprising
  a connecting cable, which is connected to the motor by a first end and is threaded through an orifice provided in the protective cap, and
  a channel-like or roof-like second section which comprises the protective cap and which is disposed obliquely with respect to the shaft and extends over a part length of the roller body spaced radially apart from the latter, and the second section has a laying device and/or fixing device, in particular a groove, in which the connecting cable is laid/fixed.

On the one hand, the interior of the roller body, for example an internally lying roller bearing or an internally lying electronic circuit, is protected from dripping liquids by the first section of the protective cap and, on the other hand, the components lying underneath, in particular the electrical connector box of the conveyor system, are protected by the second section. The protective cap thereby fulfils a dual function. Generally speaking, the protective cap may be of a single-part or multi-part design and/or may be produced by an injection casting process.

Consequently, fault-free operation of the conveyor roller/conveyor system can be guaranteed if containers containing liquid break when being conveyed on the conveyor system or are already broken on entering the conveyor system. Damage, such as short circuits, faults, rust and corroded contacts for example, can thus be prevented without necessarily having to provide (expensive) seals for the affected areas. The requisite protection class governing safety in standard applications involving conveyor rollers and conveyor systems can therefore be complied with without providing additional seals, for example on plugs, between housing parts of the connector box and such like. Naturally, however, this does not rule out the use of seals.

The conveyor roller comprises a motor disposed in the roller body for driving the roller body and a connecting cable running out of the roller body and electrically connected to the motor. This results in a compact design of a conveyor roller. In principle, however, the protective cap may naturally also be used if the conveyor rollers are idling rollers (without a motor).

The laying device and/or fixing device on the second section enables the connecting cable to be laid in a predefined manner. Specifically, the latter may be provided in the form of a groove in which the connecting cable is laid/fixed. Other means for laying the cable are then no longer necessary. Naturally, the laying device and/or fixing device may also be provided in the form of a cable clip, for example. In many cases, it is desirable to keep the distance of the conveyor roller from the connector box as short as possible, for example in order to keep the height of the frame profiles short and/or to keep the connecting cable short. Nevertheless, the connecting cable should be prevented from rubbing on the rotating conveyor roller. In addition to providing protection against moisture or in addition thereto, the second section of the protective cap based on this embodiment also fulfils the function of providing mechanical protection for the connecting cable. The reason for using the second section might therefore also be to provide mechanical protection for the connecting cable. The protective cap then fulfils a triple function in the manner specified above.

Other advantageous embodiments and features of the invention may be found in the dependent claims and the description of the drawings.

It is of advantage if the second section of the protective cap extends underneath the roller body when the conveyor roller is in the mounted position. This enables system components lying underneath said section to be protected from dripping liquids. In principle, however, the second section may also be turned into a different position, for example to protect the system from being sprayed.

In this connection, it is of particular advantage if the laying device and/or fixing, device is disposed on the bottom of the second section in the mounted position. If the laying device and/or fixing device is provided in the form of a groove, it is of advantage if the groove in is open towards the bottom when the conveyor roller is in the mounted position. This enables the connecting cable of the conveyor roller to be easily secured in the groove but at the same time it is effectively protected from dripping liquids.

Based on one particularly advantageous embodiment of the conveyor system, said projection of the connector box is disposed underneath the channel-like or roof-like second section of the protective cap. With this variant, the two features described above can be combined, thereby affording particularly effective protection against dripping liquids because the electrical interface disposed between the connecting cable and connector box is protected on the one hand by the projection of the connector box and on the other hand by the channel-like or roof-like second section of the protective cap. The second section of the protective cap advantageously extends above the roof-like projection of the connector box. This enables the required safety standards to be met without having to use seals.

It is also of advantage if the connecting cable is run in a curve or a loop to an electrical interface of the connector box, and the lowest point of the curve/loop is located underneath said interface. Due to the special way in which the cabling is run, any liquids dripping down onto the connecting cable can be kept away from the connector box because they will drip off the curve/loop. The proposed features may be used individually or in combination with one another and overall will improve protection of the conveyor roller and conveyor system from dripping liquids.

The objective of the invention is also achieved by means of a conveyor system of the type outlined above and the connector box comprises a roof-like projection and the electrical interface between the connecting cable and connector box is disposed underneath the roof-like projection. Due to the special way in which the cabling is run, any liquids dripping down onto the connecting cable can be kept away from the connector box because they will drip off the curve/loop.

As a result, the interface, which is provided in the form of a plug and socket connection for example, is well protected against dripping liquids and the required safety standards can be met without having to use seals.

To provide a clearer understanding, the invention will be described in more detail below with reference to the appended drawings. Of these FIG. 1 illustrates an example of a motorized roller with the protective cap fitted, viewed from underneath at an angle;

Figure 1:
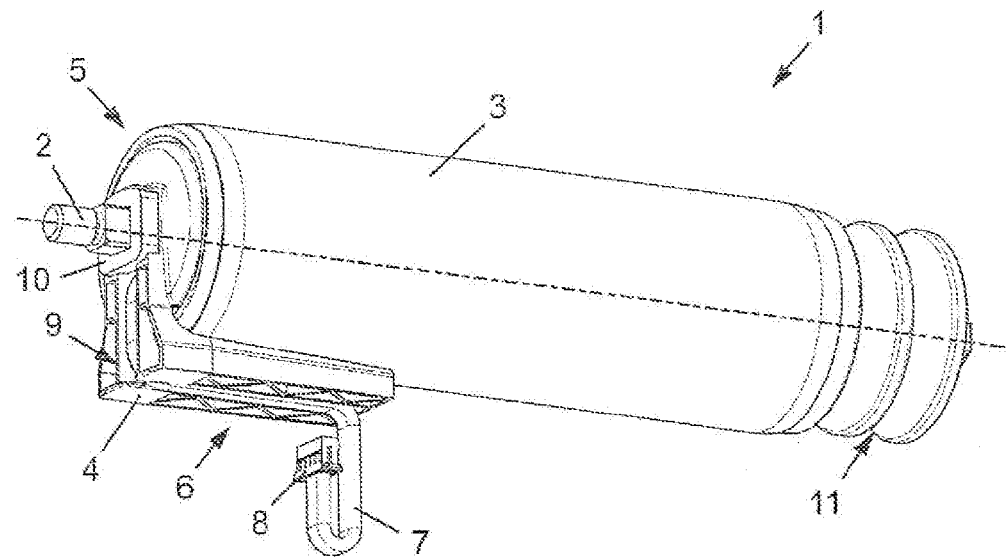

It should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features front the different embodiments illustrated and described may be construed as independent inventive solutions or solutions proposed by the invention in their own right.

Figure 2:
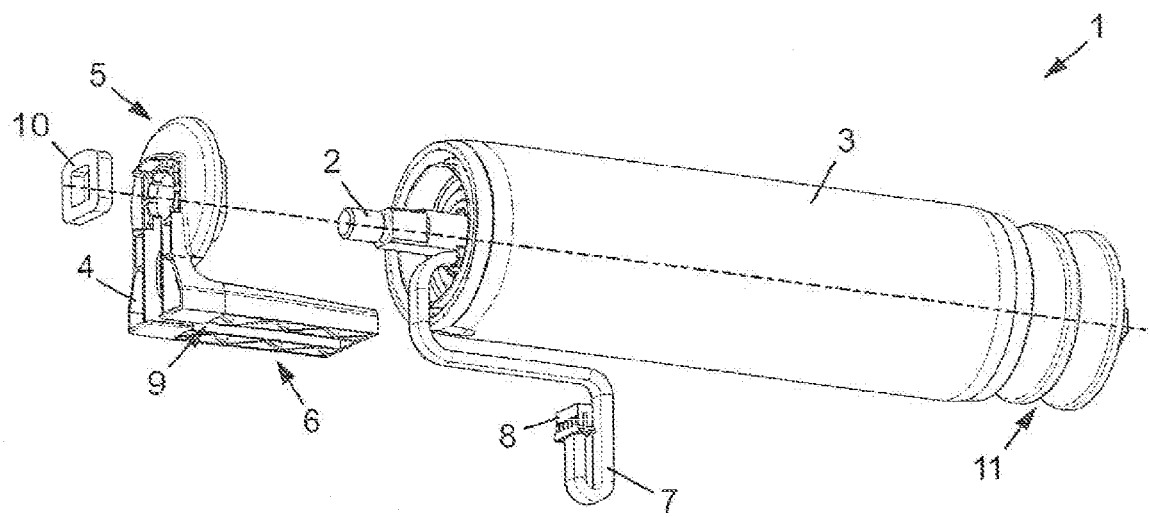
FIG. 2 is an exploded diagram of the motorized roller illustrated in FIG. 1.

FIGS. 1 and 2 illustrate an exemplary conveyor roller 1 viewed at angle (FIG. 1) and in an exploded diagram (FIG. 2). The conveyor roller 1 illustrated in FIGS. 1 and 2 is relatively short. Naturally, the following explanations would also apply to conveyor rollers of any length.

The conveyor roller 1 comprises a shaft 2 and a roller body 3 as well as a protective cap 4. The protective cap 4 comprises a disk-shaped first section 5 for covering the interior of the roller body 3, which is fixedly disposed relative to the shaft 2 and oriented normally to it. The protective cap 4 further comprises a channel-like or roof-like second section 6, which is disposed at a downwardly extending angle with respect to the shaft 2 and which extends across a part length of the roller body 3 spaced radially at a distance apart from it. As viewed from above, the shaft 2 and the longitudinal axis of the second section 6 are congruent with one another in this example. However, this need not necessarily be the case. The longitudinal axis of the second section 6 could extend at a distance apart from and parallel with the shaft 2 or at an angle to it.

Due to the first section 5 of the protective cap 4, the interior of the roller body 3, for example an internally lying roller hearing or an internally lying electronic circuit (not illustrated), is protected. The second section 6 of the protective cap 4 also affords protection for components disposed underneath the conveyor roller 1 (see also FIGS. 3 to 5). To this end, when the conveyor roller 1 is in the mounted position, the second section 6 advantageously sits underneath the roller body 3. The protective cap 4 therefore fulfils as dual function. In principle, the second section 6 of the protective cap 4 may also be turned to a different position, for example to protect system components from spray.

The conveyor roller 1 illustrated as an example comprises a motor (not illustrated) disposed in the roller body 3 for driving the roller body 3 and a connecting cable 7 running out of the roller body 3 and electrically connected to the motor by as first end. In this example, a plug 8 is connected to the connecting cable 7 at a second end.

The second section 6 of the protective cap 4 has an optional laying device and/or fixing device which runs/fixes the connecting cable 7 between the first and second end. This is specifically provided in the form of a groove 9 in which the connecting cable 7 is fixed/laid. In particular, when the conveyor roller 1 is in the mounted position—as illustrated in FIGS. 1 and 2—the groove 9 is open towards the bottom. This makes it easy to lay the connecting cable 7 of the conveyor roller 1 and provides effective protection against dripping liquids. Accordingly, no other means are needed for laying the cable. In this manner, the protective cap 4 fulfils a triple function. Naturally, the laying device and/or fixing device may also be provided in the form of a cable clip, for example, which is advantageously disposed on the bottom of the second section 6.

Finally, FIGS. 1 and 2 also illustrate an optional plate 10 for mounting the conveyor roller 1 in a conveyor system, as well as optional grooves 11 in the roller body 3, in which belts for driving adjacent and non-motorized conveyor rollers can be guided, for example.

It should be pointed out in particular that the connecting cable 7 is illustrated in the mounted position in FIG. 2. The protective cap 4 can therefore not simply be fitted by pushing it onto the illustrated assembly and instead, the connecting cable 7 would have to be threaded through an orifice provided in the protective cap 4 for this purpose.

Figure 3:
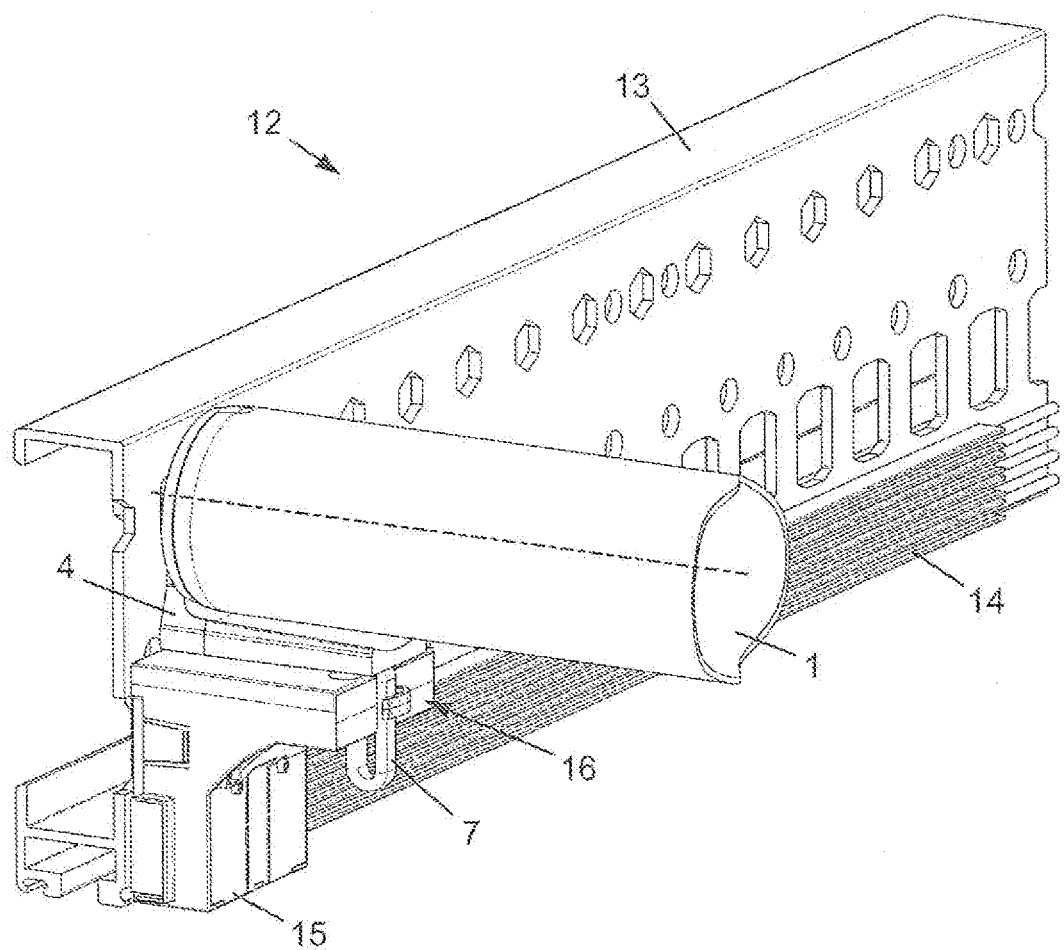
FIG. 3 shows a detail of art exemplary conveyor system, viewed at an angle from above.
Figure 4:
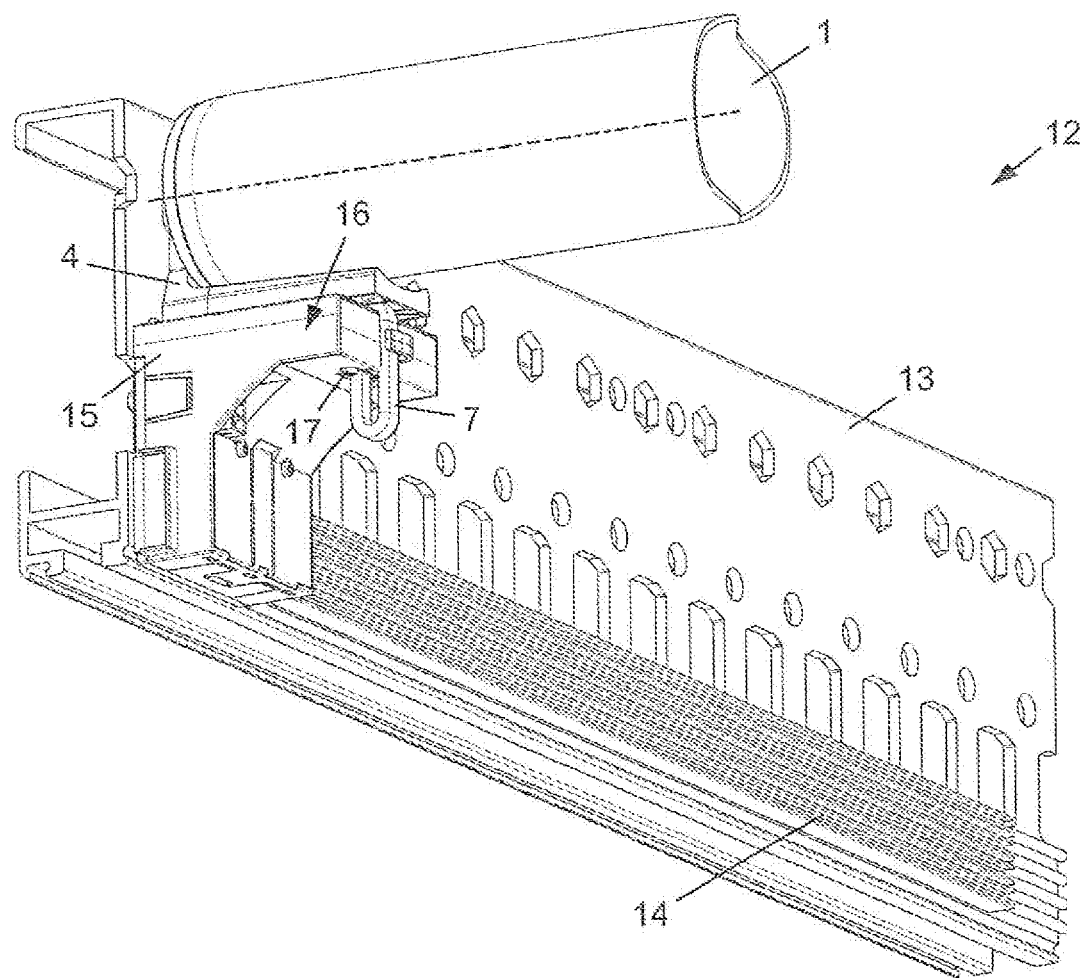
FIG. 4 is the same as FIG. 3 but viewed at an angle from underneath.
Figure 5:
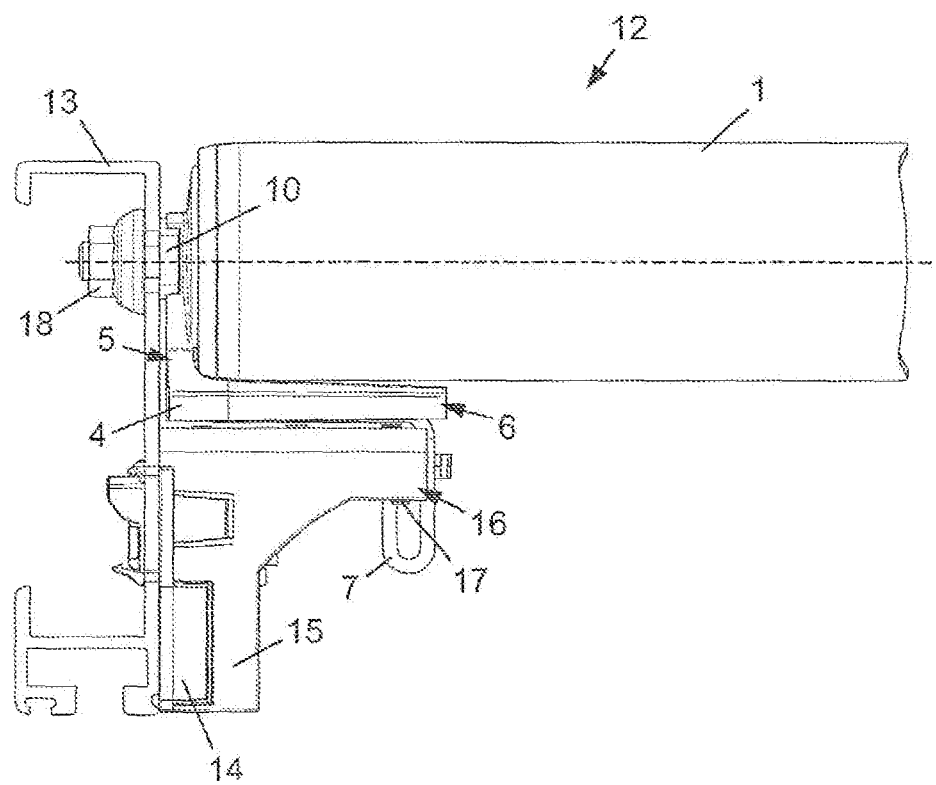
FIG. 5 is the same as FIG. 3 but viewed from the front.

FIGS. 3 to 5 illustrate a detail of an exemplary conveyor system 12. The conveyor system 12 comprises a conveyor roller 1 and two frame profiles 13 extending at a distance apart, between which the conveyor roller 1 is disposed (it should be noted that for the sake of greater overall clarity in FIGS. 3 to 5, only one of the two frame profiles 13 is illustrated). The conveyor system 12 further comprises a power supply and/or data line 14 running along the frame profile 13 and a connector box 15 disposed on the frame profile 13 which is electrically connected to the power supply and/or data line 14 and to the connecting cable 7 of the conveyor roller 1. For example, the electrical connection between the connector box 15 and the power supply and/or data line 14 may be established by means of spring contacts lying on the bare conductors of the cable 13 or also with the aid of insulation displacement contacts, for example. The connector box 15 may also contain an electronic circuit for controlling the motor of the conveyor roller 1 and/or for communicating with a higher-order controller.

In the example illustrated in FIGS. 3 to 5, the electrical interfuse between the connecting cable 7 and connector box 15, which is specifically provided in the them of a plug 8 connected to a socket 17, is disposed underneath the channel-like or roof-like second section 6 of the protective cap 4. The interface 8, 17 is also disposed underneath a roof-like projection 16 of the connector box 15.

In the case of the example specifically illustrated, both of the features described above are used and are therefore combined, although they could also be used alone. This means that said projection 16 of the connector box 15 is disposed underneath the channel-like or roof-like second section 6 of the protective cap 4. This results in particularly good protection from dripping liquids because the electrical interface 8, 17 between the connecting cable 7 and connector box 15 is protected by the projection 16 of the connector box 15 on the one hand and by the channel-like or roof-like second section 6 of the protective cap 4 on the other hand. The second section 6 of the protective cap 4 advantageously extends above the roof-like projection 16 of the connector box 15 (towards the front and/or laterally) as may be seen in particular in FIG. 5.

In the example illustrated in the drawings, the socket 17 is disposed directly on or in the housing of the connector box 15. It would naturally also be conceivable for the socket 17 to be provided on a cable running out of the housing of the connector box 15. Naturally, instead of the plug 8, it would also be possible for a socket to be provided on the connecting cable 7 and a plug to be provided on the connector box 15 instead of the socket 17.

Another feature to provide protection against dripping liquids, which is illustrated in FIGS. 1 to 5 and can be used alone or in any combination with the aforementioned features, is the fact that the connecting cable 7 is run to the electrical interface 8, 17 of the connector box 15 in a curve, and the lowest point of the curve lies below said interface 8, 17. By running the connecting cable 7 in this special way, dripping liquids can be kept away from the connector box 15 because they drip off this curve, instead of the curve, it would naturally also be possible to provide a loop in the cable run.

In FIGS. 3 to 5, the conveyor roller 1 is screwed to the frame profile 13 with the aid of a nut 18. However, the conveyor roller 1 could naturally also be secured on or in the frame profile 13 in some other way.

The embodiments illustrated as examples represent possible variants of a conveyor roller 1 and a conveyor system 12 proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

In particular, it should be pointed out that in reality, a conveyor roller 1 respectively a conveyor system 12 may also comprise more or fewer components than those illustrated.

For the sake of good order, finally, it should be pointed out that, in order to provide a clearer understanding of the structure of the conveyor roller 1 respectively a conveyor system 12, they and their constituent parts are illustrated to a certain extent out of scale and/or on are enlarged scale and/or on a reduced scale.

The objective underlying the independent inventive solutions may be found in the description.

LIST OF REFERENCE NUMBERS

1 Conveyor roller
2 Shaft
3 Roller body
4 Protective cap
5 First section of protective cap
6 Second section of protective cap
7 Connecting cable
8 Plug
9 Groove for connecting cable
10 Plate
11 Groove for belt 12 Conveyor system
13 Frame profile
14 Power supply and/or data line
15 Connector box
16 Roof-like projection
17 Socket
18 Nut

The invention claimed is:

1. Conveyor roller (1), comprising a shaft (2) and a roller body (3) mounted so as to be rotatable about the shaft (2), a motor for driving the roller body (3) disposed in the roller body (3) and a protective cap (4), which protective cap (4) comprises a disk-shaped first portion (5) for covering the interior of the roller body (3), which is disposed fixedly relative to the shaft (2) and oriented normally thereto, wherein
a connecting cable (7) is provided, which is connected to the motor by a first end and is threaded through an orifice provided in the protective cap (4), and
a channel-like or roof-like second section (6) comprising the protective cap (4) is disposed at an angle with respect to the shaft (2) and extends across a part length of the roller body (3) spaced radially at a distance apart therefrom and the second section (6) comprises a laying device and/or fixing device, in particular a groove (9), in which the connecting cable (7) is laid/fixed.

2. Conveyor roller (1) according to claim 1, wherein the second section (6) extends underneath the roller body (3) when the conveyor roller (1) is in a mounted position.

3. Conveyor roller (1) according to claim 1, wherein the laying device and/or fixing device is disposed on the bottom of the second section (6), and in particular the groove (9) is open towards the bottom when the conveyor roller (1) is in the mounted position.

4. Conveyor system (12), comprising a conveyor roller (1) according to claim 1, comprising
two frame profiles (13) extending at a distance apart between which the conveyor roller (1) is disposed,
a power supply and/or data line (14) running along a frame profile (13), and
a connector box (15) disposed on the frame profile (13) which is electrically connected to the power supply and/or data line (14) and to the connecting cable (7) of the conveyor roller (1).

5. Conveyor system (12) according to claim 4, wherein an electrical interface (8, 17) between the connecting cable (7) and connector box (15) is disposed underneath the channel-like or roof-like second section (6) of the protective cap (4).

6. Conveyor system (12) according to claim 5, wherein the electrical interface (8, 17) between the connecting cable (7) and connector box (15) is provided in the form of a plug and socket connection.

7. Conveyor system (12) according to claim 4, wherein the connector box (15) has a roof-like projection (16) and the electrical interface (8, 17) between the connecting cable (7) and connector box (15) is disposed underneath said projection (16).

8. Conveyor system (12) according to claim 7, wherein said projection (16) of the connector box (15) is disposed underneath the channel-like or roof-like second section (6) of the protective cap (4).

9. Conveyor system (12) according to claim 4, wherein the connecting cable (7) is run in a curve or a loop to the electrical interface (8, 17) of the connector box (15) and lowest point of the curve/loop lies underneath said interface (8, 17).

10. Conveyor system (12), comprising
a conveyor roller (1) having a shaft, a roller body (3) mounted so as to be rotatable about the shaft (2), a motor for driving the roller body (3) disposed in the roller body (3), a protective cap (4) and a connecting cable (7) running out of the roller body (3) and electrically connected to the motor, and the protective cap (4) comprises a disk-shaped first section (5) for covering an interior of the roller body (3), which is disposed fixedly relative to the shaft (2) and oriented normally thereto, and a channel-like or roof-like second section (6) which is disposed at an angle with respect to the shaft (2) and extends across a part length of the roller body (3) spaced radially at a distance apart therefrom,
two frame profiles (13) extending at a distance apart between which the conveyor roller (1) is disposed,
a power supply and/or data line (14) running along a frame profile (13) and
a connector box (15) disposed on the frame profile (13) which is electrically connected to the power supply and/or data line (14) and to the connecting cable (7), and which is disposed underneath the roof-like second portion (6) of the protective cap (4),
the connecting cable (7) is provided with a plug (8) or socket (17) at one end and the connecting cable (7) is run in a curve or a loop to a socket (17) or a plug (8) on the connector box (15), and the plug/socket connection forms an electrical interface (8, 17), and a lowest point of the curve/loop lies underneath said interface (8, 17) wherein the connector box (15) comprises a roof-like projection (16) and the electrical interface (8, 17) between the connecting cable (7) and connector box (5) is disposed underneath the roof-like projection.

* * * * *

UNITED STATES PATENT AND TRADEMARK OFFICE
CERTIFICATE OF CORRECTION

| | |
|---|---|
| PATENT NO. | : 9,586,763 B2 |
| APPLICATION NO. | : 15/028073 |
| DATED | : March 7, 2017 |
| INVENTOR(S) | : Reischl |

Page 1 of 1

It is certified that error appears in the above-identified patent and that said Letters Patent is hereby corrected as shown below:

In the Claims

In particular, in Column 8, Line 14, (Line 4 of Claim 9) before the word "lowest" please insert: --a--.

Signed and Sealed this
First Day of August, 2017

Joseph Matal
*Performing the Functions and Duties of the*
*Under Secretary of Commerce for Intellectual Property and*
*Director of the United States Patent and Trademark Office*